United States Patent [19]

Cherian

[11] Patent Number: 4,828,380
[45] Date of Patent: May 9, 1989

[54] ANTI-GLARE EYEGLASSES

[76] Inventor: Gabe Cherian, 52 Amorok Way, Fremont, Calif. 94539

[21] Appl. No.: 49,705

[22] Filed: May 13, 1987

[51] Int. Cl.⁴ ............................................. G02C 7/16
[52] U.S. Cl. .......................................... 351/45; 351/44
[58] Field of Search .............................. 351/44, 45, 47

[56] References Cited

U.S. PATENT DOCUMENTS

| | | |
|---|---|---|
| 1,067,793 | 7/1913 | Barr . |
| 1,239,691 | 11/1917 | Howe . |
| 1,270,640 | 6/1918 | Markham . |
| 1,545,978 | 7/1925 | Rollins . |
| 1,643,509 | 9/1927 | Moran . |
| 1,676,760 | 7/1928 | Wilson . |
| 1,706,429 | 3/1929 | Willard . |
| 1,723,474 | 8/1929 | Esleck . |
| 1,723,475 | 8/1929 | Esleck . |
| 1,828,850 | 10/1931 | Shryock . |
| 1,882,909 | 10/1932 | Rhue . |
| 1,938,085 | 10/1933 | Page ............................ 88/41 |
| 1,985,668 | 12/1934 | Peavey .......................... 2/12 |
| 2,146,544 | 2/1939 | Kleine ........................... 2/12 |
| 2,230,009 | 1/1941 | Ordorica ...................... 88/41 |
| 2,358,602 | 9/1944 | Snyder .......................... 2/12 |
| 2,445,153 | 7/1948 | Rearick ......................... 2/14 |
| 2,639,429 | 5/1953 | Lundberg ...................... 2/14 |
| 2,639,430 | 5/1953 | Gale .............................. 2/14 |
| 2,699,093 | 1/1955 | Auwärter ..................... 88/41 |
| 2,875,670 | 3/1959 | Thornton ..................... 88/41 |
| 3,199,114 | 8/1965 | Malifaud ..................... 351/45 |
| 3,512,880 | 5/1970 | Alexander et al. ........... 351/45 |
| 3,664,733 | 5/1972 | Kalkowski ................... 351/45 |
| 3,819,189 | 6/1974 | Goode .......................... 273/183 |
| 4,023,892 | 5/1977 | Smith ........................... 351/45 |
| 4,338,003 | 7/1982 | Adrian ......................... 351/45 |

FOREIGN PATENT DOCUMENTS

| | | |
|---|---|---|
| 820385 | 9/1951 | Fed. Rep. of Germany . |
| 1401452 | 4/1965 | France . |
| 1375298 | 11/1974 | United Kingdom . |

Primary Examiner—Rodney B. Bovernick
Assistant Examiner—P. M. Dzierzynski
Attorney, Agent, or Firm—T. Gene Dillahunty

[57] ABSTRACT

This invention provides anti-glare eyeglasses for drivers for shielding the glare of on-coming headlights and the glare of headlights of following vehicles reflected in rear view mirrors. The central vision area is bordered by a shaded area on the left side, the edge of the shaded area next to the central vision area is vertical and straight, the shaded area extends to the left at an angle corresponding to the apparent angle at which the on-coming headlights pass to the left of the driver, and additional shaded areas are provided to the left and right for screening the headlight glare of following vehicles reflected in rear view mirrors. The shaded areas may be reversed for use by drivers driving on the left side of the road. The invention also provides a kit of parts of attachable shaded shapes which can be placed on regular eyeglasses to correspond to the eyeglasses of this invention.

18 Claims, 7 Drawing Sheets

ANTI-GLARE EYEGLASSES

FIELD OF THE INVENTION

This invention relates to anti-glare eyeglasses and related articles for use at night by drivers of motor vehicles to reduce or eliminate the glare of the headlights of on-coming traffic and the glare of headlights of following vehicles reflected in the rear view mirrors. This type of eyeglasses are sometimes referred to as antidazzle eyeglasses.

BACKGROUND OF THE INVENTION

Ever since automobiles have been driven with headlgiths at night, there has been a problem of how to reduce the glare of oncoming headlights when meeting another automobile. For example, U.S. Pat. Nos. 1,067,793 filed by Barr in 1911 and 1,239,691 filed by Howe in 1915 provide goggles or eyeglasses with lenses having partially shaded or opaque areas intended to block headlight glare. Numerous variation of eyeglasses and shades have been devised for anti-glare use in night driving. Exemplary of such variations are the eyeglasses shown in U.S. Pat. Nos. 1,643,509 to Moran, 1,676,760 to Wilson, 1,706,429 to Willard, 1,723,474 to Esleck, 2,230,009 to Ordorica, 2,358,602 to Snyder, 2,639,430 to Gale, 2,699,093 to Auwarter, 2,875,670 to Thorton, 3,199,114 to Malifaud, 3,512,880 to Alexander et al., 3,6664,733 to Kalkowski and 4,338,003 to Adrian. The disclosures of the above patents are incorporated herein by reference.

In my copending applcation Ser. No. 049,706 field of even date with this application and entitled "Anti-glare Visor System" I have described and claimed anti-glare visor systems for vehicles which can be used to screen headlight glare at night. The disclosure of said copending application is incorporated herein by reference.

Of the numerous variations of anit-glare eyeglasses in the prior art, none has satisfactorily solved the problem of headlight glare and each design contains certain deficiencies and problems in actual use. For example, some are too restrictive, block too much vision and are not adaptable in actual use to bvariabel road conditions, as in Adrian, cited above. Others reduce vision in the primary field of vision, such as in Kalkowski. Moreover, the problem of headlight glare in rear view mirrors has not been addressed by the prior art with respect to anti-glare eyeglasses to any significant extent. Therefore, it is an object of this invention to provide anti-glare eyeglasses and related articles for effective elimination or reduction of headlight glare.

I have observed that during night driving the driver's eyes are adapted to low light levels and are sensitive to bright light. It is believed that the pupils of the eyes are open wide and the retinas are adapted to viewing objects in dim light and are very sensitive to bright light. When exposed to a bright light, suddenly or momentarily, like an on-coming headlight, the brigh light causes momentary or temporary "blindness" in at least that part of the eye and frequently in most or all of the eye, particularly when the ambient light conditions are very low and the bright light is very bright. It is believed that this momentary or temporary "blindness" is caused by the pupil closing and by over exposure of the retina while the eye is in a sensitised condition due to the low ambient light conditions. Recovery from this temporary "blindness" and a return to normal sight for the existing conditions can take a certain period of time before road conditions ahead of the driver can be seen again clearly enough. This results in a very dangerous condition when a driver of a motor vehicle is momentarily or temporarily "blinded" by headlight glare and cannot see normally for such a period of time, particularly when the driver is traveling at a high rate of speed. This momentary or temporary "blindness" can be caused not only from the glare from headlights of on-coming vehicles but also and independently from the glare from headlight reflected in rear view mirrors from vehicles following the driver. Therefore, it is an object of this invention to provide effective shielding in either or both cases, that is of both on-coming headlight glare and/or the glare of headlights reflected in rear view mirrors.

SUMMARY OF THE INVENTION

In one aspect this invention provides anti-glare eyeglasses for drivers of vehicles, wherein each lens area for each eye comprises:

(a) a central vision area extending substantially to the upper portion and lower portion of the lens and having sufficient width for the driver to have an unobstructed view, with the driver's head in normal position, of straight ahead traffic in the driver's side of the roadway from at least the right side of the roadway to at least the center of the roadway;

(b) a first shaded area adjacent to the left side of the central vision area and extending outwardly and laterally therefrom wherein (i) the bottom boundary or the top boundary of the shaded area is angled to substantially correspond to the apparent angle at which the headlights of on-coming traffice move past the driver, (ii) the distance between the top and bottom boundaries of the shaded area is sufficient to provide effective shielding of the glare of the headlights of the on-coming traffic as the headlights move past the driver, (iii) the boundary between the shaded area and the central vision area is substantially straight and vertical and (iv) the shaded area extends outwardly sufficiently to provide effective shielding of the on-coming traffic headlight glare substantially to the limit of the driver's peripheral vision; and (c) a second shaded are which is positioned outside the left portion of the first shaded area and which extends a sufficient amount to effectively shield the headlight glare of a following vehicle reflected in the exterior rear view mirror to the left of the driver.

In another aspect this invention provides anti-glare eyeglasses for drivers of vehicles, wherein each lens area for each eye comprises:

(a) a central vision area extending substantially to the upper portion and lower portion of the lens and having sufficient width for the driver to have an unobstructed view, with the driver's head in normal position, of straight ahead traffic in the driver's side of the roadway from at least the right side of the roadway to at least the center of the roadway;

(b) a first shaded area adjacent to the left side of the central vision area and extending outwardly and laterally therefrom wherein (i) the bottom boundary or the top boundary of the shaded area is angled to substantially correspond to the apparent angle at which the headlights of on-coming traffice move past the driver, (ii) the distance between the top and bottom boundaries of the shaded area is sufficient to provide effective shielding of the glare of the headlights of the on-coming traffic as the headlights move past the driver, (iii) the boundary between the shaded area and the central vision area is substantially straight and vertical and (iv) the shaded area extends outwardly sufficiently to provide effective shielding of the on-coming traffic headlight glare substantially to the limit of the driver's peripheral vision; and (c) a second shaded area which is positioned to the right of the central vision area and which is positioned to effectively shield the headlight glare of a following vehicle reflected in a rear view mirror positioned to the right of the driver.

In one preferred aspect, the eyeglasses of this invention include both the above second shaded area positioned to shield the glare reflected in the left rear view mirror and the above second shaded area positioned to shield the glare reflected in the right rear view mirror, in addition to the first shaded area which shields the glare from on-coming traffic.

In another aspect, this invention provides the above eyeglasses in a form wherein the bottom boundaries of the shaded areas described above are positioned so that the shaded areas do not cover the on-coming traffic vision area or rear view mirror fields of the driver's vision, but are positioned such that the driver can cover those fields of the driver's vision with the shaded areas by a slight downward movement of the eyeglasses.

In another aspect, this invention provides the above eyeglasses in a form wherein the bottom boundaries of the shaded areas are positioned so that the shaded areas cover the on-coming traffic or rear view mirror fields of the driver's vision and are positioned such that the driver can uncover these fields of the driver's vision by a slight upward movement of the eyeglasses.

In another aspect, this invention provides the above eyeglasses in a form wherein the bottom boundaries of the shaded areas are positioned so that each shaded area covers its respective field of vision at different times uopn progressive downward movement of the eyeglasses. Alternatively, this invention provides the above eyeglasses in a form wherein the bottom boundaries of the shaded areas are positioned so that each shaded area uncovers its respective field of vision at different times upon progressive upward movement of the eyeglasses.

In another aspect, the eyeglasses of this invention can have the boundary between the first shaded area and the central vision area positioned further to the left than it would normally be to correspond to the above and the driver can cover and uncover the on-coming headlight and/or the respective rear view mirror fields of vision by side to side movement of the eyeglasses, e.g., by rotating his or her head left or right. In this configuration the shaded areas can also be arranged so that they can be moved to cover and uncover these fields of vision by diagonal movement, e.g., down and to the right or up and to the left, or by any desired combination of up and down, side to side or diagonal movements of the eyeglasses.

The descriptions herein are in terms of the areas as viewed by the driver wearing the eyeglasses and looking through the eyeglasses.

While this invention is described in the embodiment of eyeglasses, it is to be recognized that this invention is equally applicable in the form of other embodiments of eye protection or devices which can be worn by the driver. For example, motorcycle helmet face shields having the above described shaded areas appropriately arranged in accordance with the above disclosure, are within the scope of this invention. In addition, the eyeglasses, face shields or other forms in which this invention is used need not be full glasses or face shields, but may be partial lenses, shades or face shields which incorporate the shaded areas of this invention or a combination of these shaded area with portions of clear areas. Such partial lenses may be desirable because of their light weight.

In another aspect, this invention provides a kit of parts of attachable glare shields having configurations such that they can be applied to plain, clear or regularly-worn eyeglasses to convert such eyeglasses to antiglare eyeglasses according to this invention as described above. These attached glare sheilds may be mechanically attachable, self-adhesive or attachable by any other means suitable for the eyeglasses or face shields to which they are to be attached. The kit of parts may include variously configured shaded strips of self-adhesive glare shields which can be used to add to or subtract from the boundaries of any of the shaded areas according to this invention. For example, such strips can be added to or removed from the bottom of the above first shaded area to change the apparent angle of that shaded area, as may be needed by the driver when the driver changes vehicles, for example from a sports car to a truck. The total area and boundaries of any of the shaded areas of this invention can be so modified, including enlarging the shaded areas of eyeglasses, face shields and the like which have permanent shaded areas. Any such kit of parts will also be useful on motorcycle helment face shields where the attachable or self-adhering shaded glare shield can be applied to the face shield to shade or screen the desired vision areas according to this invention. The placement of the glare shields on a helment face shield is equivalent to placing them on eyeglasses, because the face shield is fixed in position relative to the driver's field of vision, in much the same way as eyeglasses are and can be moved relative to the driver's line of vision in the same way as eyeglasses. The face shield with the glare shields in place thereon is used in the same way that the eyeglasses of this invention are used by the driver.

DESCRIPTION OF THE INVENTION

The first feature of the anti-glare eyeglasses of the present invention is that there are no shaded areas above or below the central vision area of the driver. This allows the driver to lower or raise the eyeglasses relative to the driver's line of sight without obstructing the primary or central vision area. This central vision area is positioned so that it extends at least from the right side of the roadway to at least the center of the roadway. This allows the driver unobstructed vision of the portion or lane of the roadway on which the driver is driving, as well as traffic lights and other important road signs that may be overhead. It should be noted, however, that the central vision area need not extend all the way to the top or bottom of the lens.

The second feature of the anit-glare eyeglasses of the present invention is that the shaded area positioned to the left of the central vision area has a bottom boundary or a top boundary which is positioned at an angle so that it corresponds to the apparent angle at which the on-coming headlights move past the driver and has a substantially straight and vertical edge or boundary between it and the left edge of the central vision area. While the other (top or bottom) boundary of this shaded area need not be positioned at the apparent angle, the height of this shaded area is to be sufficient to effectively screen the on-coming headlights as they pass the driver. The "apparent angle" at which the bottom boundary or the top boundary of this shaded area is positioned will vary according to the height of the driver above the roadway and is determined by the apparent path or track the on-coming headlights follow as they approach and pass the driver on the left. As percieved by the driver, the on-coming headlights first appear striaght ahead and on the horizon, i.e., level with the driver's eyes. The on-coming headlights then approach and pass to the left of hte driver at a height below the driver's eyes. The angle between this apparent path or track of the headlights from the horizon to a point to the left of and below the level of the driver's eyes and a horizontal reference line is the "apparent angle" referred to in this invention. This explanation is for a normal car or truck; the angle can be an angle above the horizontal, as explained in the further description of this invention and in the drawings. As measured down from the horizontal, the apparent angle will be greater for the driver of a truck than for the driver of an automobile, because the truck driver's eyes are higher above the roadway than the automobile driver's eyes. For the driver of a low sports car the apparent angle may be zero, i.e., horizontal, or even negative, i.e., an angle above the horizontal, which will be the case where the driver's eyes are at a level below the level of the on-coming headlights and where the on-coming headlights of normal sized cars, trucks and the like pass on the left of the driver at a level above the horizontal level of the sports car driver's eyes. The apparent angle generally will be greater for a motorcycle rider than for the driver of an automobile and usually the greatest for a driver of a truck or bus. When the bottom boundary of this shaded area is positioned at the apparent angle, the shaded area is used by positioning the shaded area above the on-coming vehicle headlights and lowering the shaded area to screen the glare from those headlights when desired and raising the shaded area when the screening is not desired. When the top boundary of this shaded area is positioned at the apparent angle, the shaded area is used by positioning the shaded area below the on-coming vehicle headlights and raising the shaded area to screen the galre from those headlights when desired and lowering the shaded area when the screening is not desired. Of course, it the top and bottom boundaries are both positioned at the apparent angle, then the shaded area can be used above or below the vision area the driver desires to screen.

It is an important feature of this first shaded area that the right edge or boundary be substantially straight and vertical, so that the driver can move the vertical position of the eyeglasses of this invention realative to the driver's line of sight by raising or lowering the eyeglasses, for example, by slightly rotating his or her head forward or backward, without unintentionally covering or shading a desired line of sight in the central vision area. If the edge or boundary of this shaded area is angled, curved or irregular, as in some of the prior art, it is more difficult for the driver to quickly shade or screen the exact area or line of vision in which the driver desires to reduce or eliminate the glare of on-coming headlights without imparing the driver's vision in his or her driving lane. The preseent invention allows precise screening of a desired area by the driver by using simple or single head movements or movements of the eyeglasses, compared to the complex and sometimes unpredictable movements required by some of the prior art glasses. For example, this invention also allows easy adjustment to on-coming headlight glare on curved roads. Since the boundary between the left edge of the central vision area and the shaded area to the left side of the central vision area is vertical, the driver can easily keep that boundary positioned on the centerline of the roadway at any point on the roadway ahead, by rotating his or her head (or moving the eyeglasses) slightly to the left or right as needed to follow the curves in the roadway ahead.

Another important feature of this invention resides in the feature of the bottom boundary of the first shaded area being positioned at an angle substantially corresponding to the apparent angle at which the headlights of the on-coming traffic moves past the driver. This bottom boundary will normally be positioned so that it just covers the path of the headlights and screens the glare of those headlights, which allows the driver to then uncover that path or area of vision by slightly raising the eyeglasses relative to the driver's line of vision. However, in rainy conditions the glare of on-coming headlights is frequently reflected on the wet roadway and the reflection can have the same blinding effect on the driver's vision as the headlights themselves. In this situation the glare from the reflection is shining at the driver and passes the driver at approximately the same apparent angle as the headlights themselves, but is coming from a lower position compared to the headlights themselves, relative to the roadway surface. The present inveniton allows the driver to effectively shade or shield that lower area merely by quickly and easily moving the first shaded area of this invention down until that lower area of reflection from the roadway surface is covered by the first shaded area without obstructing or interferring with the main central vision area. This is in part made possible by the present invention because of the unobstructed central vision area and by the vertical boundary of the first shaded area at the central vision area. A driver may want to have separate eyeglasses according to this invention for dry weather and for rainy conditions, or may want to have attachable or adjustable shaded strips to change the lower boundary of teh first shaded area to correspond to the reflected headlights glare on wet roadways. While the eyeglasses of this invention can easily be used in both dry and wet conditions, such separate eyeglasses or attachable strips may be desired in order to avoid having to hold for extended length of time the position of the eyeglasses in the lowered position for wet roadway conditions. The above advantages are equally realized when the top boundary of the first sshaded area is the boundary positioned substantially at the apparent angle.

The next feature of the eyeglasses of the present invention is a second shaded area positioned to shade or screen the glare of the headlights of a following vehicle reflected in one or more rear view mirrors. This second shaded area will usually preferably be on the left side of the eyeglasses lenses and will be positioned above, below or to the left of the first shaded area, depending on the position of the rear view mirror being used by the driver and can be adjacent to, contiguous with or separate from the left portion of the first shaded area, as dictated by the position of the rear veiw mirror. This second shaded area can also preferably be positioned on the right side of the central vision area and positioned to correspond to the position of the right-hand rear view mirror bieng used by the driver, such as an interior mirror positioned in the center of the vehicle or an exterior mirror positioned on the right side of the vehicle or both. These second shades areas, whether on the left or on the right, or both, can be positioned on the lens area or can be separate shaded areas which are attached to the eyeglasses frame or temple pieces and can be adjustable.

In a preferred form, the eyeglasses of the present invention include such a second shaded area positioned on the left side of the lenses and a third such shaded area positioned on the right side of the lenses as described above to screen both left-hand and right-hand rear view mirror as well as on-coming headlight glare.

The bottom edges or boundaries of the shaded areas of the eyeglasses of the present invention are preferably positioned so that when the driver changes the position of the eyeglasses and/or shaded areas relative to the driver's line of vision while driving, for example, by rotating his or her head slightly forward or backward, the shaded areas can all cover their respective intended areas at the same time or can cover their respective intended areas selectively, sequentially or individually. For example, the driver may wish to screen the rear view mirror areas of vision, for example by rotating his or her head through a certain angle, without screening the area of vision where the headlight glare of the on-coming traffic appears until actually meeting another on-coming vehicle. Then the driver can also screen that area of on-coming headlights when desired, for example by further rotating his or her head through a larger angle, thus lowering the bottom boundaries of the shaded area to the desired level.

In some preferred configurations, the eyeglasses of the present invention provide additional advantages where the bottom coundaries of the shaded areas are positioned above or can be raised by the driver above the driver's normal fields of vision. This provides added safety in that the shaded areas do not cover or obstruct any normal field of vision, until a field of vision has unwanted headlight glare enter into that field and that driver positions a shaded area to screen the glare in that field. Otherwise, the driver's normal field of vision is unaffected by wearing the eyeglasses of this invention. This can be particularly important when proceeding from stop signs and when looking for other traffic (e.g., when changing lanes or merging) or for signs, stop lights and thelike. It is also important to note that the central vision area of the eyeglasses of this invention allows unobstructed view of the instrument panel and dashboard of the vehicle, and positioning the shaded area according to these preferred configurations can assure that the entire instrument panel or dashboard is visible to the driver at all times.

Figure 1:
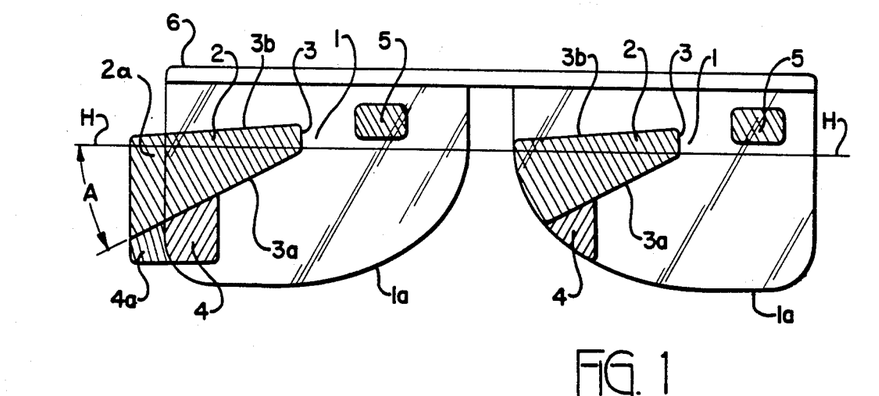
FIG. 1 shows a preferred embodiment of the antiglare eyeglasses of this invention.

The eyeglasses of this invention can be more clearly illustrated by referring to the embodiments shown in the drawings. FIG. 1 shows eyeglasses 6 having shaded areas according to this invention as viewed by the wearer of the eyeglasses. Central vision areas 1 extend from the top of the lens area to the bottom of the lens area. While it is preferred in many instances that the central vision area 1 extend from the top of the lenses to the bottom of the lenses 1a, there may be other areas in the upper or lower portions of the lens area, such as shading or bifocal lenses, provided that the central vision areas in the central portion of the lens area are substantially unobstructed.

Figure 3:
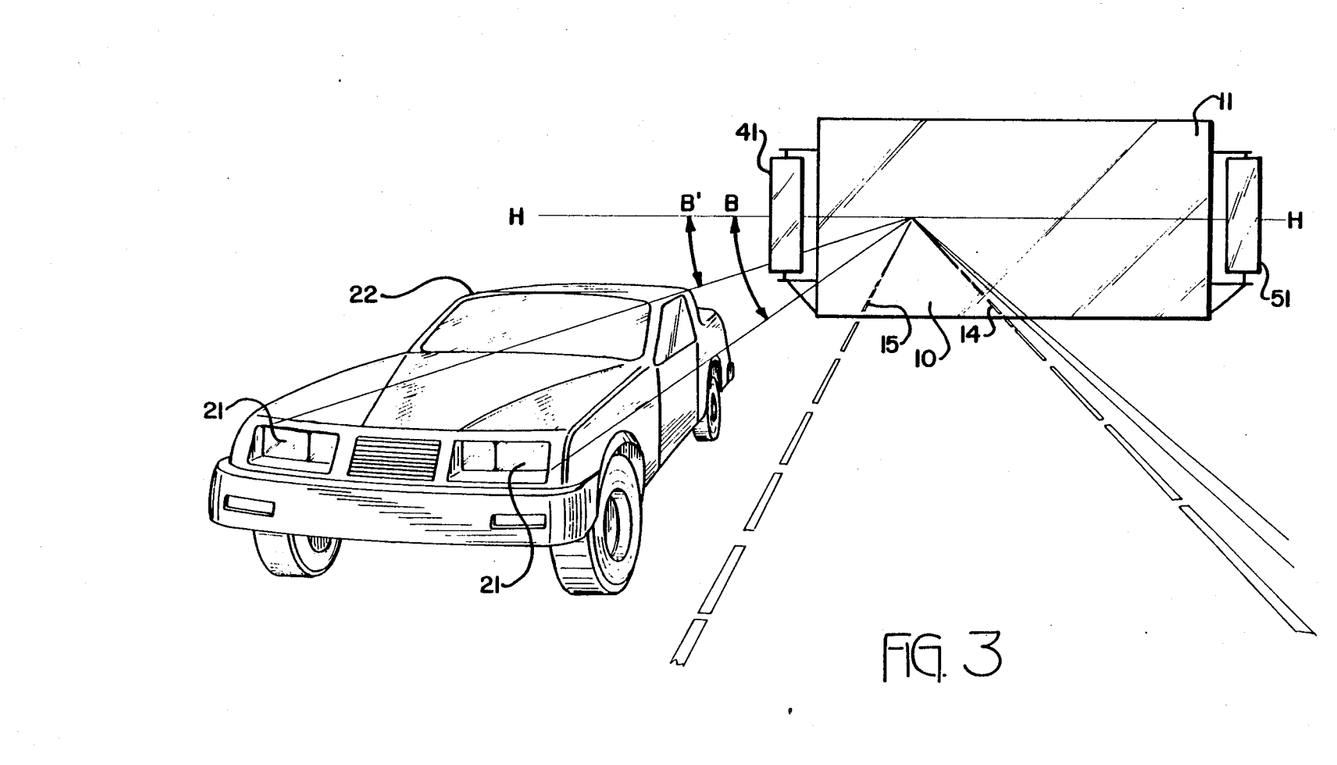
FIG. 3 shows the apparent angle for hte driver of a large truck as seen by the driver through a perspective forward view.
Figure 4:
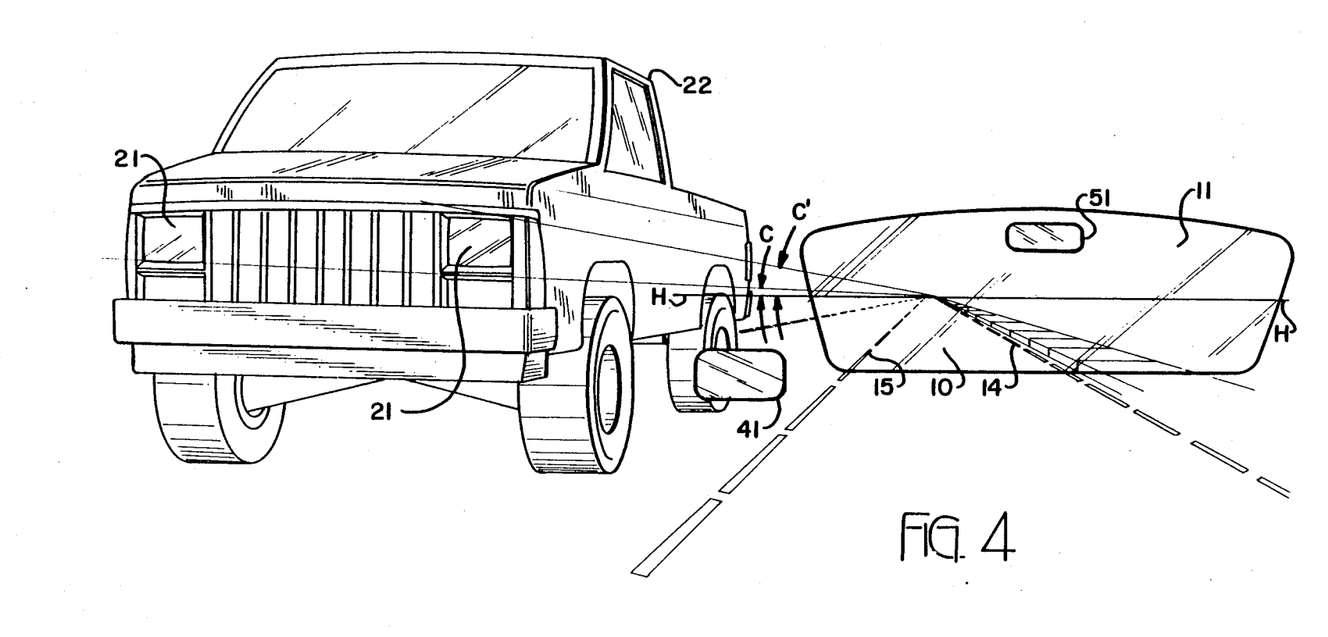
FIG. 4 shows the apparent angle for the driver of a low sports car as seen by the driver through a perspective forward view.

Shaded areas 2 extend latterly to the left from the left side of central vision areas 1 and the bottom boundaries 3a of shaded areas 2 are at an apparent angle A with respect to the horizontal reference line H, which corresponds to the angle at which the on-coming headlights pass to the left of the driver. Shaded areas 2 have boundaries 3 which are substantially straight and substantially vertical and positioned at the left side of the central vision areas 1. The vertical height of shaded areas 2 is sufficient to effectively screen the glare of on-coming headlights 21 and may vary along the length of the shaded area 2. For example, shaded areas 2 may be smaller in height near the central vision areas 1 and larger in height toward the outside of the lenses 1a in order to effectively screen the glare of the on-coming headlights 21 as they appear larger and larger as they approach the driver, while still providing effective screening near the central vision areas 1 for headlights 21 which are more distant from the driver. The top boundaries 3b of shaded areas 2 may extend to the tops of the lens area if desired, for example to screen the glare of overhead street lights and the like, but it is generally preferred that the shaded areas only be of a height, varied or constant, which is effective in screening the glare of the on-coming headlights 21. The top boundaries 3b may be positioned at any desired angle or position, provided it is above angle A' in FIG. 2, so that shaded area 2 provides the desired overall screening. Similarly, the top boundaries 3b in other embodiments would need to be above angles B' and C' as shown in FIGS. 3 and 4, respectively. It should also be noted that shaded areas 2 need not extend all the way to the left edge of the lens area, but only extend far enough to provide the desired areas of screening. In particular, it should be noted that shaded area 2 of the right lens need not extend to the left edge of the lens because the nose of the driver will usually block the glare of on-coming headlights from the right eye when they are close enough to be in that area of the peripheral vision of the driver's right eye.

Shaded areas 4 are positioned to screen the glare of the headlights of a following vehicle being reflected in the left-hand rear view mirror and shaded area 5 are positioned to screen the glare of the headlights of a following vehicle being refelcted in the right-hand rear view mirror. Either or both of shaded areas 4 and 5 may be used in the anti-glare eyeglasses of this invention and may be positioned as necessary to be effective for the particular rear view mirrors being used by the driver. The areas on the right lens and left lens are not identical or necessarily proportionally the same because the lenses themselves are not identical. For example, area 4 on the right lens is smaller or truncated by the curve of the lens and because the bridge of the driver's nose will block the on-coming headlight glare at some point as the headlights move past driver on the left, while areas 2 and 4 on the left lens may extend lower or further outward than a normal eyeglasses lenses, as illustrated by 2a and 4a, respectively, or may even extend and become part of the left temple.

Figure 2:
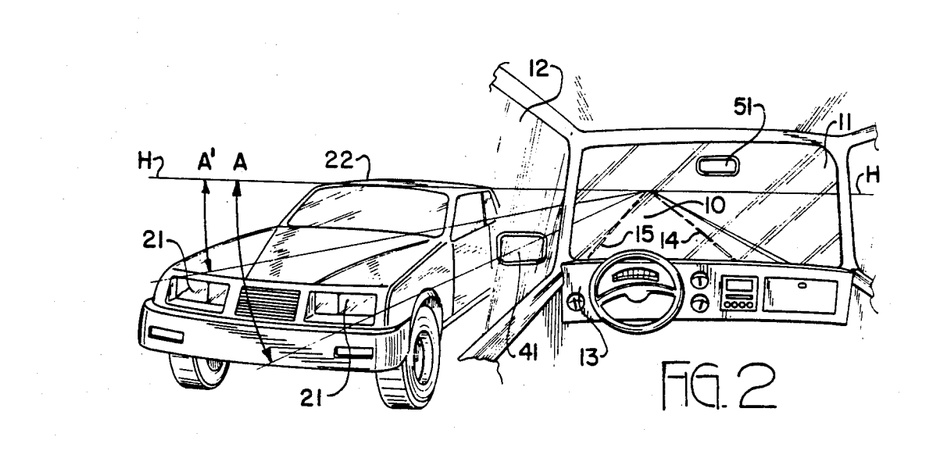
FIG. 2 shows the apparent angle for the driver of an automobile and FIGS. 2a, 2b and 2c show perspective forward views as seen by a driver of the automobile through the eyeglasses of this invention.
Figure 2A:
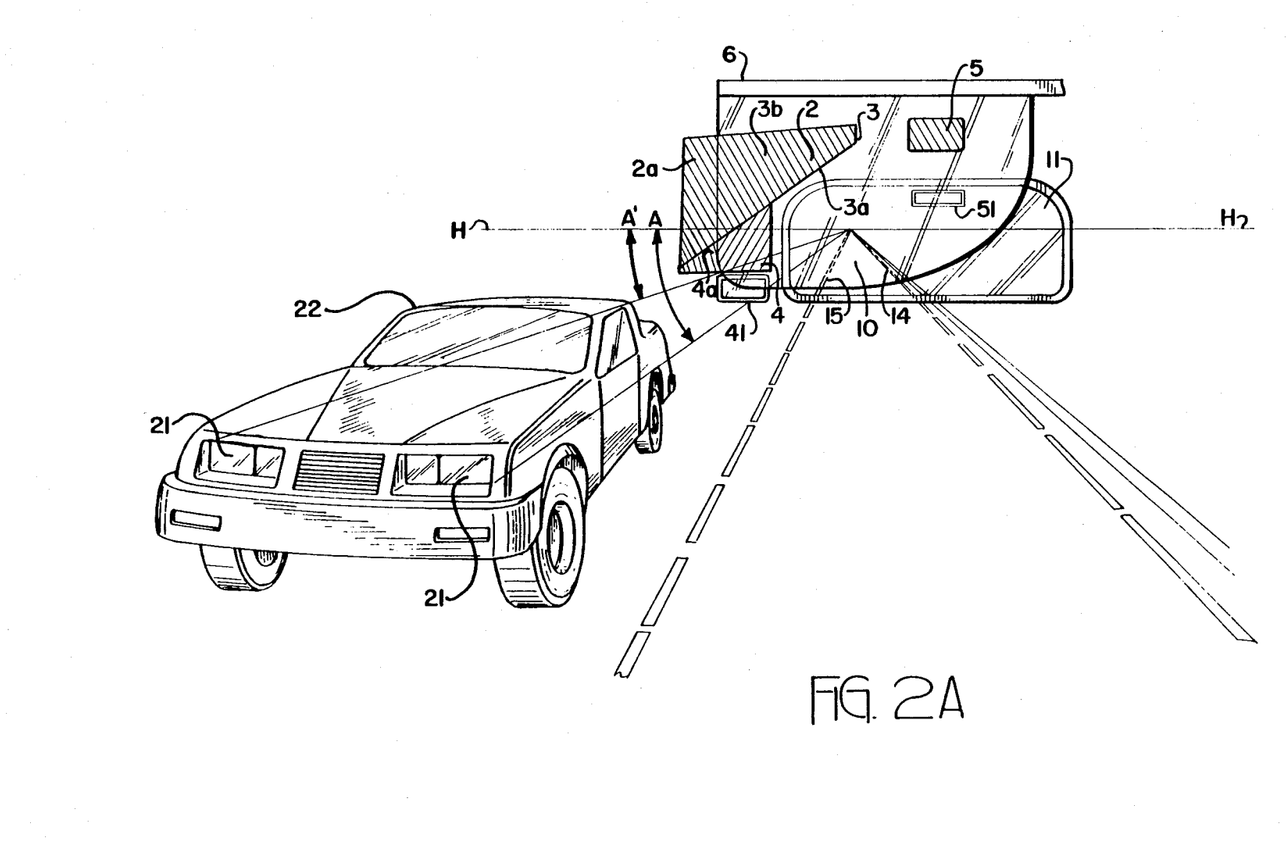
Figure 2B:
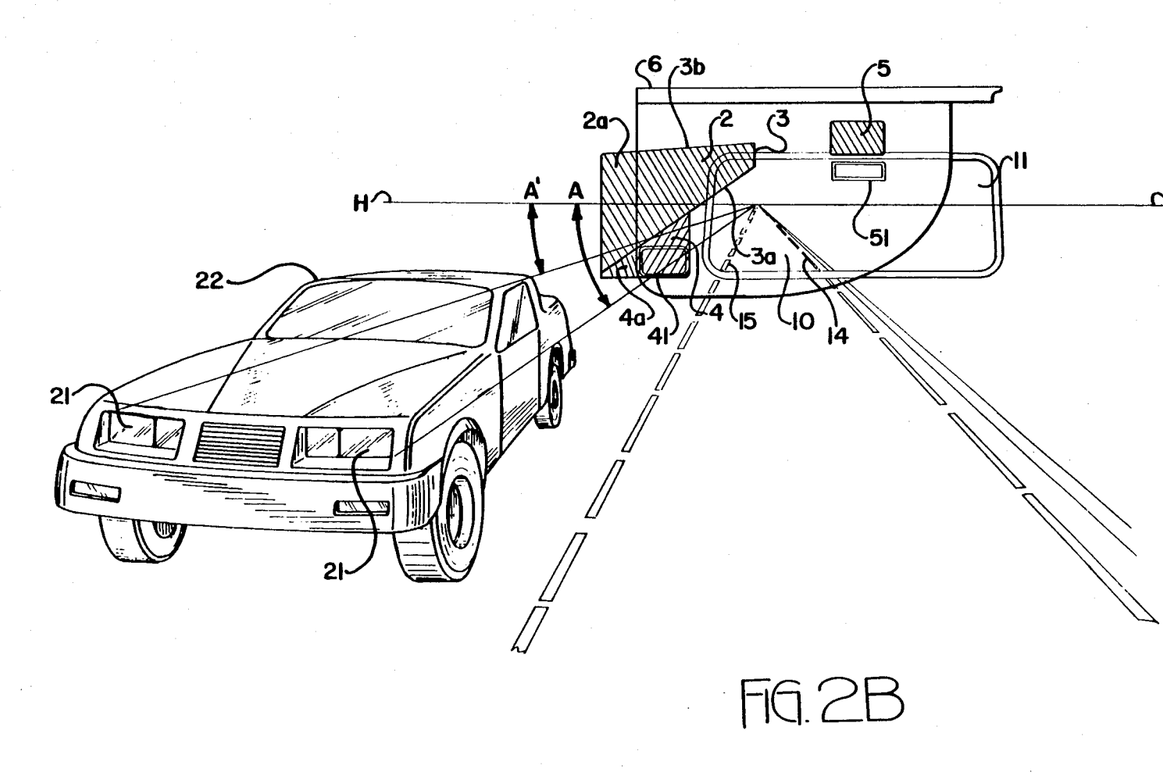
Figure 2C:
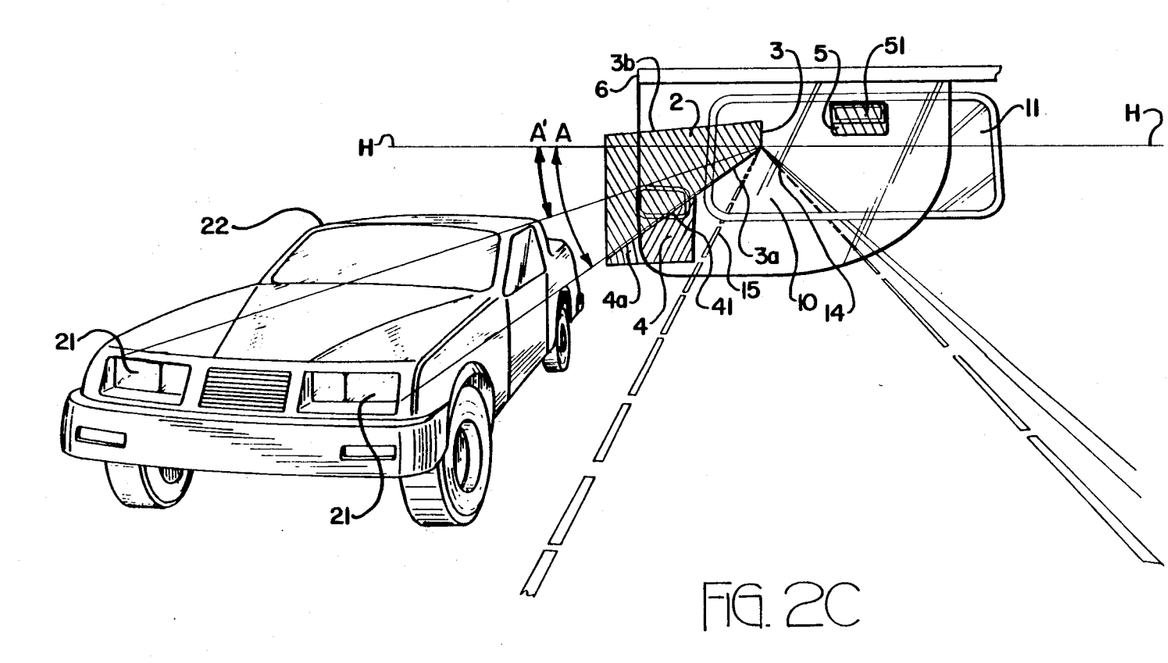

FIG. 2 is a perspective view of the roadway 10, windshield 11, side window 12, instrument panel 13 and mirrors 41 and 51, as seen through either eye by the driver, and shows the apparent angle at which the on-coming headlights pass to the driver's left. The apparent angle A is the angle from the horizontal reference line H to the bottom of the path at which headlights 21 of on-coming vehicle 22 pass to the driver's left side. FIG. 2a illustrates the position of eyeglasses 6, as seen through the left lens (for illustration purposes in this description), when the driver has the eyeglasses positioned so that the shaded areas 2, 4 and 5 of the eyeglasses do not cover either the areas of the on-coming headlights or the rear view mirrors 41 or 51. As illustrated in FIGS. 2b and 2c the eyeglasses 6 can be lowered progressively by the driver by slightly rotating his or her head forward to cause shaded area 4 to screen the glare of rear view mirror 41, and further to cause shaded area 5 to screen the glare of rear view mirror 51 and to cause shaded area 2 to screen the glare of the on-coming headlights 21. This process can then be reversed by the driver to uncover or remove the screen from each area as desired by slightly rotating his or her head backward. Alternatively, it should be noted that the shaded areas of the eyeglasses of this invention can be positioned so they cover or screen the desired areas when the eyeglasses and the driver's head are in the normal position. In this case the driver can progressively uncover or remove the screen from the desired area by slightly rotating his or her head backward, then again cover or screen those areas by slightly rotating his or her head forward back to the normal position.

In the description of the present invention, it is intended that references to the driver raising or lowering the eyeglasses is intended to include any method chosen by the driver to do so, whether it be by raising or lowering the eyeglasses manually by the driver relative to the driver's head, by raising or lowering the shaded areas relative to the eyeglasses and/or the driver's line of vision, by rotating the driver's head backward or forward, for example by raising or lowering the functional shaded areas relative to the eyeglasses frame worn by the driver, or by other methods selected by the driver. It should also be noted that the shaded areas can also be "raised" or "lowered" by making the bottom boundary of each shaded area change postion by decreasing or increasing the size of the shaded area by subtracting or adding shaded area at the bottom boundary thereof. This can be done by any means desired: mechanically by removing or adding strips of shaded material; chemically by materials that change color; or electrically by material that moves or changes light transmission in response to an electrical signal, such as liquid crystal materials.

It should further be noted that this invention is described in terms of the bottom boundary 3a of the first shaded area 2 being engled at the apparent angle, but this invention can also be utilized by the top boundary 3b of the first shaded area 2 being at the apparent angle A' and the first shaded area positioned below the path of the on-coming headlight glare so that the driver can simply raise the shaded area 2 by slight movement to screen the glare of the on-coming headlights 21. In such an embodiment the apparent angle for top boundary 3b will be angle A' in FIG. 2 and the position of bottom boundary 3a will not be important so long as it is positioned below angle A. The same is true for such an embodiment with respect to angles B and B' in FIG. 3 and angles C and C' in FIG. 4. In such embodiments, shaded area 2 should be the minimum height, top to bottom, as possible and still provide the desired headlight glare screening without obscuring any more of the instrument panel than necessary when shaded ares 2 is lowered.

However, it is preferrred to use the embodiment of this invention in which the bottom boundary of first shaded area 2 is positioned at the apparent angle and shaded area 2 is positioned above the apparent path of the on-coming headlights then lowered by slight movement when it is desired to screen the glare of the on-coming headlights. This preferred embodiment leaves the driver's view of the instrument panel of the vehicle completely unshaded and unobstructed all times.

It should be noted that the embodiments shown in these FIGS. are preferred embodiments and are not representative of the scope of this invention. For example the shaded areas of the eyeglasses of this invention need not be positioned so that the areas are screened sequentially, as described above, but may be positioned so that the areas are screen simultaneously or in any order desired for a particular use, vehicle or driving condition encountered by the driver. It is important that the central vision area be unobstructed, that the shaded areas 2 have bottom boundaries at the apparent angle, as illustrated and that the shaded areas 2 have substantially straight and vertical boundaries 3 adjacent to the left side of the central vision areas 1. It is preferred, in addition, that at least one rear view mirror area be screened by the shaded areas of the lenses. The straight and vertical boundaries 3 assure unobstructed vision of roadway 10 from at least the right side 14 of the roadway to at least the center 15 of roadway 10.

One preferred embodiment of the eyeglasses of this invention includes partial lenses which are cut off at the bottom of the shaded areas. This embodiment provides eyeglasses which are very small and light weight.

FIG. 3 shows the perspective view as seen by the driver of a tall truck or bus and shows the apparent angle B of the on-coming headlights, with respect to the reference horizontal line H, as seen by the driver of the truck or bus. As can be seen, the apparent angle B is larger for the truck or bus driver than for the driver of an automobile.

FIG. 4 shows the perspective view as seen by the driver of a low sports car and shows the apparent angle C of the on-coming headlights as seen by the driver of the sports car. It should be noted that the apparent angle C can be an angle above the horizontal reference line H, and that the botom edge of boundary of shaded area 2 of the eyeglasses of this invention will correspond to that apparent angle for the driver of the sports car in order to effectively screen the glare of on-coming headlights for that driver to leave the maximum view unrestricted. The angle, of course, could be like angle B in FIG. 3, but if eyeglasses having angle B on the first shaded area were used driving a car or sports car, too much area would be shaded. It, therefore, is preferred that a driver use eyeglasses of this invention having apparent angle appropriate for the vehicle being driven.

This invention has been described using the term "eyeglasses", which is intended to include not only conventional eyeglasses having a frame and lenses but other forms of vision correction or modification and eye protection devices worn by the drivers of vehicles. For example, the face shields of motorcycle helmets, visors, goggles and the like which are worn by the driver are included within the scope of the term "eyeglasses" for purposes of describing and claiming the present invention. All that is required is that the areas of vision for each eye be shaded according to this invention. Also, as used herein, including the claims hereof, the terms "lens" and "lens area" mean the vision area covered by a lens in eyeglasses or by a corresponding vision area on a motorcycle helment face shield or other eye or head wear on which the anit-glare shaded areas can be employed according to the present invention. Similarly, this invention has been described primarily in terms of drivers of motor vehicles, such as cars, trucks, motorcycles and the like, but it is equally applicable to drivers or operators of non-motorized vehicles, such as bicycles. Moreover, while the description of the eyeglasses herein is in terms of drivers or operators of vehicles and the eyeglasses of this invention are primarily useful for and intended for drivers, of course, passengers and pedestrains can use the eyeglasses of this invention to great advantage as well to reduce eye strain and improve night vision. The eyeglasses of this invention can be used for other purposes as well where the shaded areas and central vision areas constructed in accordance with this invention provide desired anti-glare shielding.

In the description of this invention, reference is made to the upward or downward movement of the eyeglasses. It is intended that this movement is described as relative to the driver's line of sight and can be accomplished in any manner appropriate and preferred by the driver, such as be tilting or rotating the driver's head forward or backward, by raising or lowering the eyeglasses on the driver's head, by raising or lowering the lenses on the eyeglasses frames, or by any other method.

Figure 5:
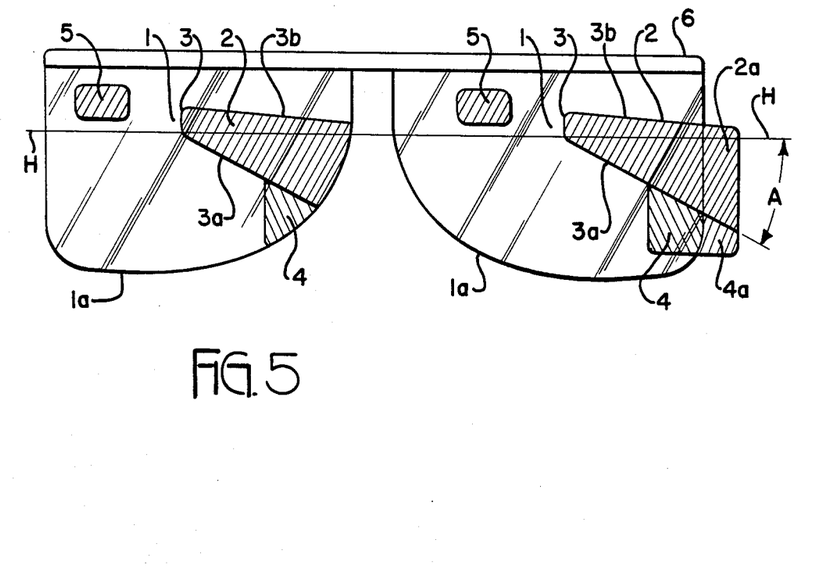
FIG. 5 shows the eyeglasses of FIG. 1 in reverse configuration for use in driving on the left side of the roadway.

The description of this invention has been relative to drivers operating vehicles on the right side of the roadway. It is to be understood that the eyeglasses of this invention are equally applicable in the reverse or mirror image configuration for use by drivers driving on the left side of the roadway. That is, the left and right configurations described above are reversed in a mirror image configuration of the eyeglasses for driving on the right side of the roadway to provide eyeglasses for driving on the left side of the roadway and screening headlight glare passing the driver on the right side as well as screening rear view mirror glare as described herein. This reverse configuration of the eyeglasses is shown in FIG. 5 wherein each element and its position and function are identical to those defined with respect to FIG. 1 above, except being reversed for use when driving on the left side of the roadway.

This invention is equally applicable to clip-on glasses, i.e., glasses or shades which clip on or attach to the outside or inside of regular eyeglasses, as it is to the regular eyeglasses. The clip-on glasses can be made with the shaded areas positioned according to this invention then clipped on the driver's regular eyeglasses when desired for use at night. The clip-on glasses or the mounting of the shaded areas can be hinged in the style of flip-up glasses and can be attached to the main glasses frame or to the temple pieces as appropriate to provide the shaded areas according to this invention. In addition, the kit of parts of attachable glare shields described herein, including mechanically attachable, self-adhereing or self-adhesive types, can be applied to the clip-on glasses as well to produce the shaded areas positioned according to this invention. Similarly, a flip-down arrangement can be attached to a motorcycle helment visor, with or without a face shield present.

The materials used for the shaded areas of the eyeglasses of this invention can be any known material which provides the desired shading in the desired degree and pattern. The shading may be from plastic, glass or other material, may be polarized, mirrored, uniaxial, unidirectional or otherwise oriented and may be fixed or variable intensity, like sunglasses that darken in brighter sunlight. The degree of shading should preferrably be only dark enough for eliminating the unwanted glare from the on-coming headlights or the headlights in the rear view mirrors while leaving the headlights visible to the driver through the shaded areas. This is an important safety aspect. Eliminating the undesired glare will improve the driver's overall night vision and having the headlights visible to the driver through the shaded areas assures that the driver is aware of the presence and position of the other vehicles at all times. Each shaded area may be uniform in shading or may be darker in one part or portion of the area than in other parts or portions. For example, the first shaded area can be lighter near the central vision area, because the intensity of the on-coming headlights is less at the further distance, and can be darker toward the left, because the intensity of the headlights increases as the on-coming headlights come closer and pass by the driver. Conversely, some drivers may prefer to have the first shaded area darker near the central vision area and lighter to the left, because the glare is less bothersome as the on-coming headlights move more and more toward the peripheral vision of the driver. The second and third shaded areas can likewise have varied shading according to the preferrences of the driver.

One skilled in the art will recognize that may variations and embodiments of the present invention can be made within the scope of this invention reflected by the following claims.

I claim:

1. Anti-glare eyeglasses for drivers of vehicles, wherein each lens or vision area for each eye comprises:
    (a) a central vision area extending substantially to the upper portion and lower portion of the lens area and having sufficient width for the driver to have an unobstructed view, with the driver's head in normal position, of straight ahead traffic in the driver's side of the roadway from at leat the right side of the roadway to at least the center of the roadway; and
    (b) a shaded area being positioned adjacent to the left side of the central vision area and extending outwardly and laterally from said central vision area and having a top boundary, a bottom boundary and a right boundary adjacent to said central vision area, wherein (i) the bottom boundary of the shaded area is substantially straight and is angled to substantially correspond to the apparent angle (A) at which the headlights of on-coming traffic move past the driver whereby the vision area below the apparent angle (A) at which the headlights pass the driver is not screened or obstructed by the shaded area when the eyeglasses are in normal position for screening the on-coming headlights, (ii) the distance between the top and bottom boundaries of the shaded area is sufficient to provide effective screening of the glare of the headlights of the on-coming traffic as the headlights move past the driver, (iii) the right boundary of the shaded area adjacent to the central vision area is substantially straight and vertical and (iv) the shaded area extends outwardly sufficiently to provide effective screening of the on-coming traffic headlight glare substantially to the limit of the driver's peripherial vision.

2. Anti-glare eyeglasses according to claim 1 further comprising:
(c) a second shaded area which is positioned outside the left portion of the first shaded area and which extends a sufficient amount to effectively screen the headlight glare of a following vehicle reflected in the exterior rear view mirror to the left of the driver.

3. Anti-glare eyeglasses according to claim 2 further comprising:
(d) a third shaded area which is positioned outside and to the right side of the central vision area and which is positioned to effectively screen the headlight glare of a following vehicle reflected in a rear view mirror positioned to the right of the driver.

4. Anti-glare eyeglasses according to claim 3 wherein the bottom boundaries of the shaded areas are adapted to be initially positioned by the driver so that the shaded areas do not cover the on-coming traffic or mirror fields of the driver's vision and are positioned such that the driver can cover those fields of the driver's vision with the shaded area by slight movement of the eyeglasses.

5. Anti-glare eyeglasses according to claim 4 wherein the bottom boundaries of the shaded areas are positioned so that each shaded area covers its respective field of vision at different times upon progressive movement of the eyeglasses.

6. Anti-glare eyeglasses according to claim 3 wherein the bottom boundaries of the shaded areas are adapted to be initially positioned by the driver so that the shaded areas cover the on-coming traffic and mirror fields of the driver's vision and are positioned such that the driver can uncover those fields of the driver's vision from screening by the shaded areas by slight movement of the eyeglasses.

7. Anti-glare eyeglasses according to claim 6 wherein the bottom boundaries of the shaded areas are positioned so that each shahed area covers its respective field of vision at different times upon progressive movement of the eyeglasses.

8. Anti-glare eyeglasses according to claim 12 wherein the bottom boundaries of the shaded areas are adapted to be initially positioned by the driver so that the shaded areas do not cover the on-coming traffic or mirror fields of the driver's vision and are positioned such that the driver can cover those fields of the driver's vision with the shaded areas by slight movement of the eyeglasses.

9. Anti-glare eyeglasses according to claim 8 wherein the bottom boundaries of the shaded areas are positioned so that each shaded area covers its respective field of vision at different times upon progressive movement of the eyeglasses.

10. Anti-glare eyeglasses according to claim 2 wherein the bottom boundaries of the shaded areas are adapted to be initially positioned by the driver so that the shaded areas cover the on-coming traffic and mirror fields of the driver's vision and are positioned such that the driver can uncover those fields of the driver's vision from screening by the shaded areas by slight movement of the eyeglasses.

11. Anti-glare eyeglasses according to claim 10 wherein the bottom boundaries of the shaded areas are positioned so that each shaded area covers its respective field of vision at different time upon progressive movement of the eyeglasses.

12. Anti-glare eyeglasses for drivers of vehicles, wherein each lens or vision area for each eye comprises:
(a) a central vision area extending substantially to the upper portion and lower portion of the lens area and having sufficient width for the driver to have an unobstructed view, with the driver's head in normal positio, of straight ahead traffic in the driver's side of the roadway from at least the right side of the roadway to at least the center of the roadway;
(b) a first shaded area being positioned adjacent to the left side of the central vision area and extending outwardly and laterally from said central vision area and having a top boundary, a bottom boundary and a right boundary adjacent to siad central vision area, wherein (i) the bottom boundary of the shaded area is substantially straight and is angled to substantially correspond to the apparent angle (A) at which the headlights of on-coming traffic move past the driver whereby the vision area below the apparent angle (A) at which the headlights pass the driver is not screened or obstructed by the shaded area when the eyeglasses are in normal position for screening the on-coming headlights, (ii) the distance between the top and bottom boundaries of the shaded area is sufficient to provide effective screening of the glare of the headlights of the on-coming traffic as the headlights move past the driver, (iii) the right boundary of the shaded area adjacent to the central vision area is substantially straight and vertical and (iv) the shaded area extends outwardly sufficiently to provide effective screening of the on-coming traffic headlight glare substantially to the limit of the driver's peripheral vision; and
(c) a second shaded area which is positinoed to the right of the central vision area and which is positioned to effectively screen the headlight glare of a following vehicle reflected in the rear view mirror positioned to the right of the driver.

13. Anti-glare eyeglasses according to claim 12 wherein the bottom boundaries of the shaded areas are adapted to be initially positioned by the driver so that the shaded areas do not cover the on-coming traffic or mirror fields of the driver's vision and are positinoed such that the driver can cover those fields of the driver's vision with the shaded areas by slight movement of the eyeglasses.

14. Anti-glare eyeglasses according to claim 13 wherein the bottom boundaries of the shaded areas are positioned so that each shaded area covers its respective field of vision at different times upon progressive movement of the eyeglasses.

15. Anti-glare eyeglasses according to claim 12 wherein the bottom boundaries of the shaded areas are adapted to be initially positioned by the driver so that the shaded areas cover the on-coming traffic and mirror fields of the driver's vision and are positioned such that the driver can uncover those fields of the driver's vision from screening by the shaded areas by slight movement of the eyeglasses.

16. Anti-glare eyeglasses according to claim 15 wherein the bottom boundaries of the shaded areas are positioned so that each shaded area covers its respective field of vision at different times upon progressive movement of the eyeglasses.

17. A kit of parts comprising individual attachable glare-screening components having configurations and being adapted so that said screening components can be attached by mechanical, self-adhering or self-adhesive means to eyeglasses to provide shaded areas as defined in any of claims 1–16.

18. Anti-glare eyeglasses according to claim 1, 2 or 12 wherein the left and right arrangements of the eyeglasses are reversed in mirror image configuration for use in driving on the left side of the roadway.

* * * * *